Patented July 5, 1938

2,123,032

UNITED STATES PATENT OFFICE 2,123,032

PREPARATION OF AMINOGUANIDINE SALTS

Joseph A. Wyler, Allentown, Pa., assignor to Trojan Powder Company, Allentown, Pa.

No Drawing. Application June 19, 1937,
Serial No. 149,244

9 Claims. (Cl. 260—125)

My invention relates to the preparation of aminoguanidine, and more specifically relates to a process for purifying solutions containing aminoguanidine. The principal object of my invention is to provide improved means for preparing aminoguanidine free from metallic impurities such as zinc.

In the commercial preparation of aminoguanidine it is customary to reduce nitroguanidine by means of zinc dust and acetic acid, zinc dust and hydrochloric acid, zinc dust and sulphuric acid, or by means of zinc dust and an acetate of a heavy metal such as copper, zinc, cobalt, nickel, etc. in the presence of water. The chemical changes involved in this reduction may be expressed as follows:

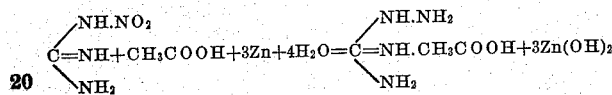

nitroguanidine+acetic acid+zinc+water=aminoguanidine

Although the above represents the main reaction, the reduction is invariably accompanied by an over-reduction of a portion of the nitroguanidine to ammonia, and some of the zinc used in the reduction passes into solution as zinc acetate, as basic zinc acetate, as a double salt of zinc and ammonium acetates, or in some other soluble form.

The presence of this zinc in solution causes difficulty in the preparation of pure aminoguanidine salts and necessitates the use of large amounts of ammonium hydroxide or ammonium salts in order to keep this zinc in solution during the precipitation of the aminoguanidine as bicarbonate by means of water soluble bicarbonates as is the usual commercial practice.

I have discovered that the addition of potassium ferrocyanide to the aminoguanidine solution obtained in the reduction of nitroguanidine precipitates the soluble zinc from the solution in a very satisfactory manner and that this precipitated zinc compound can be filtered off and a filtrate obtained which contains only an insignificant amount of zinc in solution. I have also discovered that this addition of potassium ferrocyanide may be so conducted as to have substantially no deleterious effect upon the aminoguanidine radical itself.

I have further discovered that this separation of the soluble zinc from aminoguanidine solutions may be effected in acid, neutral or alkaline mediums.

In order to more clearly point out my invention, the following illustrative example is given.

104 parts, by weight, of finely crystalline nitroguanidine and 130 parts of commercial copper acetate crystals are treated with 1500 cc. of water and the mixture stirred at room temperature. This mixture is slowly added with stirring to a slurry consisting of 380 parts of zinc dust and 500 parts by weight of water.

The stirring is continued and the temperature is allowed to rise to about 45° C. and maintained at this temperature by the use of cooling water around the reaction vessel or by means of crushed ice added to the reaction mixture itself. About 40 minutes is required for the addition and about 10 minutes more for completion of the reaction. In order to determine the point at which the reduction is complete, the usual ferrous sulfate-caustic soda test is applied.

The details of the reduction step just given are not a part of the present invention but are given to more clearly show how my present invention cooperates with the steps old in this art, in the making of aminoguanidine salts.

The mixture resulting from the reduction will have most of its zinc present in an insoluble form and therefore a simple filtration removes this insoluble zinc. However, the soluble zinc passes through the filter and contaminates the aminoguanidine solution and thereby necessitates the use of additional steps and precautions in order to separate the aminoguanidine salt in a pure condition.

In one modification of my invention I treat the above reaction mixture, immediately after the completion of the reduction, with about 10 parts by weight of potassium ferrocyanide in the form of a concentrated solution in water, stirring the mixture for about 10 minutes, and then filtering. The exact amount of ferrocyanide that should be added depends upon how much zinc is actually in solution and can be gauged by means of uranium acetate used as an external indicator. If an excess of potassium ferrocyanide is added the uranium acetate will develop a brownish tinge due to the reaction between the unused potassium ferrocyanide and the uranium acetate. I prefer to add an amount of potassium ferrocyanide which is just slightly less than the amount theoretically required to precipitate the soluble zinc. I then filter the mixture in any suitable manner as by means of a suction filter, Oliver filter, or the like. The filtrate will be clear and colorless and will contain the aminoguanidine acetate essentially free from zinc.

In another modification I may first filter the mixture resulting from the reduction step and then treat this filtrate with potassium ferrocyanide solution. In this case it is somewhat easier to determine the exact point at which to stop adding the ferrocyanide so as to avoid adding an excess of this reagent.

It should be noted that the filtrate obtained by first filtering off the zinc dust may be acidified slightly by means of acetic acid or the like, or it may be made more alkaline with ammonium hydroxide, and then treated with the ferrocyanide in the same manner as above. In either case there is an improvement from the standpoint of determining the point at which to stop adding the ferrocyanide.

The filtrate formed by the filtration of the ferrocyanide-treated mixture may then be used to make the bicarbonate of aminoguanidine by precipitation with a water soluble bicarbonate in the usual manner, or it may be used to make other salts as sulfate, chloride, nitrate, etc. In preparing the latter salts it is customary to first prepare the aminoguanidine bicarbonate and then to convert this bicarbonate with the corresponding acid. This intermediate separation of the bicarbonate is not necessary, as one may add the required amount of sulphuric acid, hydrochloric acid or nitric acid to the aminoguanidine solution and then evaporate to small volume to effect crystallization of the aminoguanidine salt.

Although I have referred specifically to the use of potassium ferrocyanide as the means of removing water-soluble zinc from my reaction mixture, the result that is obtained is due wholly to the precipitating action of the ferrocyanide radical, and instead of potassium ferrocyanide I may use sodium ferrocyanide or any other water-soluble ferrocyanide as my reagent with substantially equivalent results.

It should be noted that the above example is given by way of illustration and for the purpose of more clearly pointing out the invention and is not intended to limit the inventive concept to the specific features given.

I claim:

1. In the preparation of aminoguanidine by the reduction of nitroguanidine with zinc dust in the presence of water, the step comprising the addition of a water-soluble ferrocyanide to the aminoguanidine solution, whereby the soluble zinc is precipitated from the solution.

2. In the process for the preparation of aminoguanidine by the reduction of nitroguanidine with zinc dust in the presence of water, the step comprising the addition of potassium ferrocyanide to the aminoguanidine solution, whereby the soluble zinc is precipitated from the solution.

3. In the process for the preparation of aminoguanidine by the reduction of nitroguanidine with zinc dust in the presence of water, the steps comprising the addition of potassium ferrocyanide to the aminoguanidine solution and the separation of the insoluble zinc compound formed thereby, from the aminoguanidine solution.

4. The process for the preparation of aminoguanidine which comprises the reduction of nitroguanidine to aminoguanidine by means of zinc dust in the presence of a heavy-metal acetate and of water, the treatment of this reaction mixture with a solution of potassium ferrocyanide, stirring and filtering.

5. The process for the preparation of aminoguanidine which comprises the reduction of nitroguanidine to aminoguanidine by means of zinc dust in the presence of a heavy-metal acetate and of water, filtering, treating filtrate with a solution of potassium ferrocyanide and separating the insoluble zinc compound from the aminoguanidine in solution.

6. The process for the preparation of aminoguanidine which comprises the reduction of nitro guanidine to aminoguanidine by means of zinc dust in the presence of a heavy-metal acetate and of water, filtering, acidifying the filtrate, treating the filtrate with a solution of potassium ferrocyanide and separating the insoluble zinc compound from the aminoguanidine in solution.

7. The process for the preparation of aminoguanidine which comprises the reduction of nitroguanidine to aminoguanidine by means of zinc dust in the presence of a heavy-metal acetate and of water, filtering, adding ammonium hydroxide, treating the filtrate with a solution of potassium ferrocyanide and separating the insoluble zinc compound from the aminoguanidine in solution.

8. The process for the preparation of aminoguanidine which comprises the reduction of nitroguanidine to aminoguanidine by means of zinc dust in the presence of a heavy-metal acetate and of water, the treatment of this reaction mixture with a solution of potassium ferrocyanide, stirring, filtering and converting the aminoguanidine salt into other aminoguanidine salts by treatment directly in this filtered solution.

9. The process for the preparation of aminoguanidine which comprises the reduction of nitroguanidine to aminoguanidine by means of zinc dust in the presence of a heavy-metal acetate and of water, the treatment of this reaction mixture with a solution of potassium ferrocyanide, stirring, filtering and adding a water-soluble bicarbonate to this filtrate whereby to effect the precipitation of aminoguanidine bicarbonate.

JOSEPH A. WYLER.